United States Patent Office 3,511,329
Patented May 12, 1970

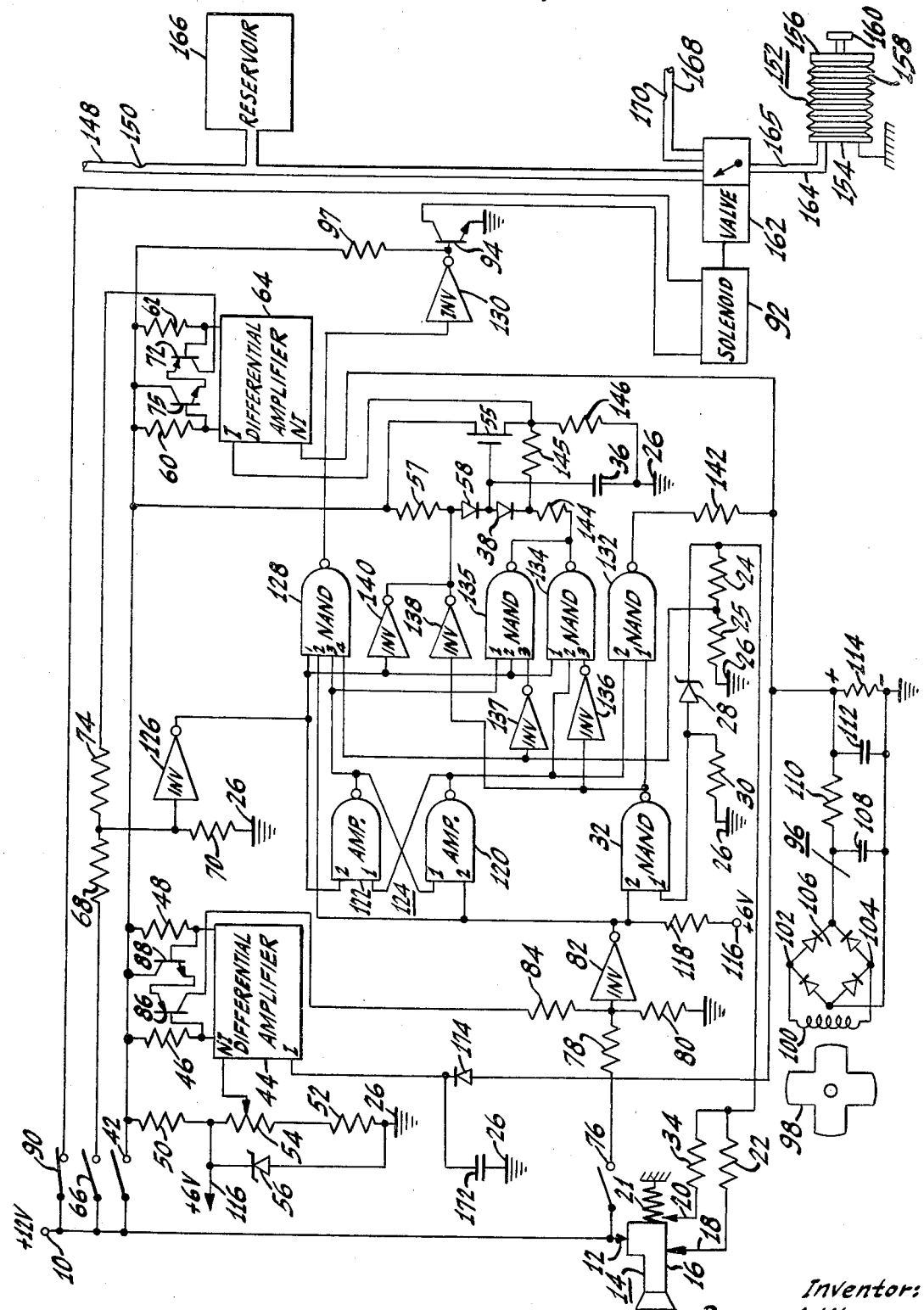

3,511,329
SPEED CONTROL FOR AUTOMOTIVE VEHICLES
Daniel A. Wisner, Detroit, Mich., assignor to RCA
Corporation, a corporation of Delaware
Filed Feb. 14, 1968, Ser. No. 705,378
Int. Cl. B60k 31/00
U.S. Cl. 180—105                                    10 Claims

ABSTRACT OF THE DISCLOSURE

A speed control apparatus for an automotive vehicle. While the speed control includes mechanically actuated means to operate the throttle, electronic elements are provided to sense the speed of the vehicle and to cause the mechanically actuated means to adjust the position of the throttle to keep the speed of the vehicle at a desired value. Electronic means are also provided to deactivate the speed control apparatus by depressing the brake pedal, to reactivate the speed control when desired, and also to increase or decrease the desired speed.

BACKGROUND

Mechanical speed control mechanisms are known. It is advantageous to provide an electronic speed control apparatus since such an apparatus requires fewer moving parts which may need lubrication, adjustment or repair, than the mechanical speed control. Furthermore, an electronic speed control apparatus can also be less expensive to make and can be less bulky than the mechanical speed control devices now known.

It is an object of this invention to provide an improved speed control apparatus.

It is a further object of this invention to provide an electronic speed control apparatus requiring a reduced amount of mechanical elements.

In accordance with the invention, electronic means are provided which continuously produce a voltage which is a measure of the speed of the vehicle. Upon attaining a desired speed, a switch is operated to store the voltage corresponding to the desired speed and to set the apparatus for operation of the vehicle at the desired speed. As the speed of the vehicle varies above or below the desired speed, the stored voltage and the continuously produced voltage are compared. Electronic means controlled by the comparison means are provided to adjust the position of the throttle in such a manner as to keep the speed of the vehicle at the desired set value. Electronic means are also provided to inactivate the speed control means while continuing to store the voltage corresponding to the previously set desired speed upon depressing the brake pedal. Electronic means are also provided to reactivate the speed setting means to its previously set value when desired, providing the vehicle is traveling above a certain minimum speed, and to increase or decrease the set speed.

The invention will be better understood upon reading the following description in connection with the sole figure of the accompanying drawing which illustrates an apparatus including the inventive device.

The ungrounded terminal 10 of the battery of the automotive vehicle (not shown) is connected to a contact 12 of a switch 14 which may be of the push-button type and which may be mounted on the steering wheel of an automobile. As shown, the push button type switch 14 comprises a metal portion 16 and two other contacts 18 and 20. The switch 14 is moveable between three positions. At its first position (the Off position shown) the contact 12 and the contact 18 are electrically connected to the metal portion 16. At its second position (the Set and Advance position) the contacts 12, 18 and 20 all touch the body portion 16 and therefore the contacts 12, 18 and 20 are all connected together. At its third position (the Retard position) the contact 12 is off the body portion 16 whereby the terminal 10 is disconnected from both contacts 18 and 20. A compression spring 21 tends to keep the switch 14 in its first or Off position.

The contact 18 is connected through resistors 22, 24 and 25 in series to system ground 26. Since the resistors 24 and 25 in series are equal to the resistor 22, in the Off position of the button 14, six volts position appears at the junction of the resistors 22 and 24. The junction of the resistors 22 and 24 is connected to the cathode of a six volt Zener diode 28. The anode of the Zener diode 28 is connected to ground 26 through a resistor 30 and to the one input terminal of a negative AND OR NAND circuit 32. Since the six volts applied to the six volt Zener diode 28 in the Off position of the switch 14 will not break it down, zero volts is applied to the 1 input terminal of the NAND circuit 32 by its connection to the anode of the Zener diode 28 at the Off position of the switch 14.

The contact 20 is connected through a resistor 34 to the junction of the resistors 22 and 24. The resistor 34 is small compared to the resistor 22, whereby, when the switch 14 is in its Set and Advance position (with the contacts 12, 18 and 20 all electrically connected), the voltage on the cathode of the Zener diode 28 is substantially 12 volts and the six volt Zener diode 28 breaks down, and six volts positive are applied to the 1 input terminal of the NAND circuit 32.

When the switch 14 is in its Retard position, that is when there is no connection to the contacts 18 and 20, no voltage is applied to the cathode of the Zener diode 28 by the car battery connected to the terminal 10, and, as will be explained, in this Retard position of the switch 14, a storage capacitor 36 will be discharged through a diode 38, a resistor 144, and through either a NAND circuit 134 or a NAND circuit 135 to ground 26. Since the push button 14, the spring 21, and the resistors 22 and 34 may all be mounted on the steering wheel column of the vehicle (not shown), only one wire (besides the power supply wire) running up the steering column provides the choice of three voltages at the junction of resistors 22 and 24.

The terminal 10 is also connected through a single pole-single throw ignition switch 42 to the output terminals of a differential amplifier 44 through respective load resistors 46 and 48. The switch 42 is also connected through resistors 50 and 52 and an intervening potentiometer 54 to ground 26. The junction of the resistor 50 and the potentiometer 54 is connected to the cathode of a Zener diode 56. The anode of the Zener diode 56 is connected to ground whereby the voltage across the potentiometer 54 and the resistor 52 is stabilized at about six volts as the voltage of the battery (not shown) varies. The slider of the potentiometer 54 is connected to the non-inverting (NI) input terminal of the differential amplifier 44.

The terminal 10 is also connected through the ignition switch 42 to the drain of an insulated gate field effect transistor 55 and to one terminal or plate of the storage capacitor 36 by way of a resistor 57 and a diode 58 in series. The other plate or terminal of the capacitor 36 is connected to ground. The diode 58 is poled for conduction of current from the terminal 10 to the capacitor 36.

The switch 42 is also connected through respective load resistors 60 and 62 to the output terminals of a second differential amplifier 64.

The terminal 10 is connected by way of a single pole-single throw Resume switch 66 through two resistors 68 and 70 in series to ground 26. The junction of the resistors 68 and 70 is connected to the collector of a PNP transistor 72 through a resistor 74. The base of the transistor 72 is connected to the junction of an output terminal of the differential amplifier 64 and the load resistor 62. The emitter of the transistor 72 is connected to the emitter of a NPN transistor 75. The collector of the transistor 75 is connected to the switch 42, and the base of the transistor 75 is connected to the junction of the load resistor 60 and the other output terminal of the differential amplifier 64. The transistors 75 and 72 comprises an amplifier whose output terminal is the collector of the transistor 72.

The terminal 10 is also connected by way of a single pole-single throw Brake switch 76 and two resistors 78 and 80 in series to ground 26. The junction of the resistors 78 and 80 is connected to the input terminal of an inverter 82, and by way of a resistor 84 to the collector of a PNP transistor 86. The base of the transistor 86 is connected to the junction of an output terminal of the differential amplifier 44 and the load resistor 46. The emitter of the transistor 86 is connected to the emitter of an NPN transistor 88 whose collector is connected to the ignition switch 42 and whose base is connected to the junction of the other output terminal of the differential amplifier 44 and the load resistor 48. The collector of the transistor 86 is the output terminal of an amplifier comprising the transistors 86 and 88.

The terminal 10 is connected by way of a normally closed Auxiliary Brake switch 90 to one terminal of a solenoid 92. The other terminal of the solenoid 92 is connected to the collector of an NPN transistor 94 whose emitter is connected to ground and whose base is connected by way of a resistor 97 to the ignition switch 42.

A vehicle speed determining device 96 comprises a magnetized rotatable armature 98 which is rotated about its axis at a speed which is related to the speed of the vehicle by means not shown. The poles of the armature 98 move by an inductance coil 100. As the armature rotates, alternating current is induced in the coil 100. The terminals of the coil 100 are connected to the diagonal connections 102 and 104 of a rectifying diode bridge 106. The other diagonal connections of the bridge 106 are connected across a filter capacitor 108. A filter resistor 110 and another filter capacitor 112 are connected across the capacitor 108. A bleeder resistor 114 is connected across the capacitor 112, one terminal of the bleeder resistor 114 being connected to ground. The voltage at the ungrounded terminal of the resistor 114 is a positive voltage with respect to ground having a ripple voltage imposed thereon. The ungrounded terminal of the resistor 114 is connected to the anode of a diode 174 whose cathode is connected to the inverting (I) input terminal of the differential amplifier 44. The I terminal of the differential amplifier 44 is connected to ground by way of a capacitor 172. The ungrounded terminal of the resistor 114 is also connected to the NI input of the differential amplifier 64. Therefore, the voltages that are applied to the NI and I terminals of the differential amplifier 44 are respectively a positive voltage which depends on the setting of the slider of the potentiometer 54 and represents a minimum speed of the vehicle below which the described speed control is inoperative, and a positive direct voltage which increases with the speed of the vehicle.

The output of the inverter 82 is connected to the 2 input terminal of the NAND circuit 32 and to a +6 volt terminal 116 through a resistor 118. The source of the +6 volts may be the junction of the Zener diode 56 and the resistor 50. A pair of amplifiers 120 and 122 each having a 1 and a 2 input terminal and one output terminal are so connected as to comprise an activate-deactivate flip-flop (F-F) circuit 124 in that the 1 input of each of the amplifiers 120 and 122 is connected to the output of the other of these two amplifiers. The 2 input terminal of the amplifier 120 is connected to the output terminal of the inverter 82 and the 2 input terminal of the amplifier 122 is connected to the output terminal of the inverter 126 whose input is connected to the junction of the resistors 68 and 70. The output terminal of the inverter 126 is also connected to the 1 input terminal of an NAND circuit 128 having 4 input terminals. The 2 input terminal of the NAND circuit 128 is connected to the terminal 116 through the resistor 118. The 3 input terminal of the NAND circuit 128 is connected to the output terminal of the amplifier 122 which comprises a part of the F-F 124. The 4 input terminal of the NAND circuit 128 is connected to the junction of the resistors 24 and 25. The output of the NAND circuit 128 is connected to the base of the NPN transistor 94 by way of an inverter 130.

The output terminal of the NAND circuit 32 is connected to the 1 input terminal of an NAND circuit 132 and to the 3 input terminal of an NAND circuit 134 through an inverter 136 and to the input terminal of an inverter 138. The output of the amplifier 120 is connected to the 2 input terminal of the NAND circuit 132 and also to the 2 input terminal of the NAND circuit 134. The 1 input terminal of the NAND circuit 128 is connected to the input terminal of an inverter 140 and to the 1 input terminal of the NAND circuit 134 and to the 2 input terminal of a NAND circuit 135. The output terminal of the NAND circuit 132 is connected to the NI input of the differential amplifier 64 by way of a resistor 142 and also to the I input terminal of the differential amplifier 44 by way of the resistor 142 and the diode 174 in series. The output of the NAND circuit 134 is connected by way of the resistor 144 to the junction of the diode 38 and a resistor 145. The output terminals of the inverter 138 and 140 are connected together and to the junction of the resistor 57 and the diode 58. The 1 input terminal of the NAND circuit 135 is connected to the output terminal of the amplifier 122. The 3 input terminal of the NAND circuit 135 is connected to the output of an inverter 137 whose input is connected to the junction of the resistors 24 and 25. The source of the transistor 55 is connected to the I input terminal of the differential amplifier 64, and by way of the resistor 145 to the junction of the resistor 144 and the diode 38 and, by way of a resistor 146, to ground 26.

A suction or vacuum tube 148 is connected to the intake manifold of the engine (not shown) of the vehicle whereby a suction or vacuum appears in the tube 148 when the engine is operating. A restriction 150 is provided in the tube 148, this restriction 150 acting as a resistance to the flow of air to the tube 148. The vacuum tube 148 extends through the restriction 150 to a reservoir 166 and also to a valve 162 which is actuated by the solenoid 92. A tube 168 having a restriction 170 extends from the valve 162 to the open air. A tube 164 having a restriction 165 therein extends from the valve 162 to a bellows 152. The bellows 152 has a relatively fixed wall 154 and a moveable wall 156 joined thereto by a flexible wall 158 which resiliently tends to remain extended. The moveable wall 156 is mechanically fixed to a shaft 160 which operates the throttle of the vehicle. When the bellows 152 is collapsed by the suction applied thereto, the throttle is opened to the maximum extend. When the solenoid 92 is energized, the valve 162 connects the bellows 152 to the vacuum tube 148 and maximum suction is applied to open the throttle. When the solenoid 92 is de-energized, the valve 162 connects the bellows 152 to the open air by way of the tube 168. The restriction 165 in tube 164 acts as a cushion means to cushion the action of the valve 162, whereby the throttle is moved more slowly as the valve 162 changes the connection of the bellows 152 between the vacuum tube 148 and the open air than if restriction 165 were not used.

The differential amplifiers 44 and 64 each have two 180 degree out-of-phase input terminals, one, as noted above, being called the inverting or I input terminal and the other being called the non-inverting or NI terminal. The differential amplifiers 44 and 64 also each have two 180 degree out-of-phase output terminals. However, the outputs at the two output terminals of each amplifier 44 and 64 are combined whereby only one output appears for each amplifier 44 and 64. The F-F circuit 124 has two conditions of stability, one when the amplifying element (not shown) in the amplifier 122 is conductive and the amplifying element (not shown) contained in the amplifier 120 is not conductive, and the other when the states of conductivity of these amplifying elements are reversed. Furthermore, a low potential on the 2 input terminal of the amplifier 120 puts the F-F circuit 124 into its deactivate state whereby the output of the amplifier 122 is low in voltage and the output of the amplifier 120 is high in voltage. A low potential at the 2 input of the amplifier 122 puts the F-F circuit 124 into its activate state, whereby the output of the amplifier 122 is high and the output of the amplifier 120 is low. A high on the 2 input of either amplifier 120 or 122 does not change the state of the F-F 124. However, a high on the 2 input of either amplifier 120 or 122 does not prevent change of state by a low on the 2 input of the other of these two amplifiers. If lows are applied simultaneously to the two inputs of both amplifiers 120 and 122, output of both amplifiers 120 and 122 goes high. When one of the two lows ends leaving one low, the output of the amplifier 120 or 122 from whose input the low has disappeared, goes low. The several inverters 82, 126, 130, 136, 137, 138 and 140 merely invert the voltages applied to the input terminals thereof. That is, if a low voltage is applied to the input terminal of an inverter, a high voltage appears at the output terminal thereof and vice versa. Each of the NAND circuits 32, 128, 132, 134 and 135, upon application of a high voltage to all input terminals thereof exhibits a low voltage at the output terminal thereof, and otherwise the NAND circuits 32, 128, 132, 134 and 135 exhibit high voltages at the output terminals thereof. When the solenoid 92 is not energized, the valve 162 is connected to open air by way of the tube 168 and no suction is applied to the bellows 152 whereby the only control applied to the throttle of the vehicle is by the accelerator pedal (not shown) thereof.

The described speed control is turned on by closing the ignition switch 42 whereby operating current is applied to the several described elements. The Zener diode 56 breaks down and a constant voltage appears across the potentiometer 54 and the resistor 52 in series. A desired portion of this voltage is chosen by manipulating the slider of the potentiometer 54, this desired portion representing a minimum speed (such as 30 miles an hour) below which the described speed control should not operate. Since at stand-still of the car, no voltage is applied to the I input of the differential amplifier 44 by the speed sensing apparatus 96, a positive or high voltage is applied to the input of the inverter 82. The output voltage of the inverter 82 is low. Since the output of the inverter 82 is applied to the 2 input of the NAND circuit 128, the output thereof is high. Low voltage is therefore applied to the base of the transistor 94, which renders it non-conductive whereby the solenoid 92 is not energized, and the valve 162 is connected to open air, and no suction is applied to the bellows 154, whereby the described speed control apparatus has no effect on the car throttle as long as the voltage at the output of the inverter 82 is low. Under these conditions the speed of the car is controlled solely by the driver as he moves the position of the accelerator pedal. As pointed out, the potential at the output of the inverter 82 will be low as long as the speed of the car is below the desired minimum speed.

Since low voltage is applied to the 2 input of the amplifier 120, the F-F 124 will be in its deactivate condition, whereby the output of the amplifier 120 is high, as long as the output of the inverter 82 is low. Since the car is stationary and the capacitor 36 is not charged, the output of the inverter 126 is high, and the 1 input of the NAND circuit 128 is also high.

At the same time, since a low potential is applied to the 2 input of the NAND circuit 32, a high appears of the output of the NAND circuit 32 and the output of the inverter 138 is low and the inverter 138 provides zero or low potential at its output and prevents charging of the capcitor 36 from the terminal 10 through the switch 42, the resistor 57 and the diode 58.

A low potential is applied to the 3 input terminal of the NAND circuit 134, whereby, its output is high, and (as will be further explained) the charge on the capacitor 36 (when it is charged) cannot discharge through the diode 38 and the resistor 144 and the NAND circuit 134. Also, a high potential is applied to the 1 input of the NAND circuit 132 by the NAND circuit 32. Since the F-F circuit 124 is in its deactivate state, a high potential is applied to the 2 input of the NAND circuit 132 and a low appears at the output of the NAND circuit 132, whereby any current produced by the speed sensing apparatus 96 (when the car is moving) flows through the resistor 142 and whereby the voltage produced by the speed sensing apparatus 96 is reduced by the resistor 142 and the NAND circuit 132 to provide a lag in the operation of the speed control circuit, as will be explained. At this moment, however, it is assumed that the car is stationary and no voltage is produced by the speed sensing mechanism 96.

Since the button 14 is in its Off position (as shown), about 6 volts is applied to the junction of the resistors 22 and 24 and therefore to the diode 28. Since the breakdown voltage of the Zener diode 28 is not exceeded, no or a low voltage is applied to the 1 input terminal of the NAND circuit 32. However, since the 2 in put thereof is low this low voltage on the 1 input of the NAND circuit 32 has no effect. While the button 14 is in its Off position, a high is applied to the 4 input of the NAND circuit 128 and a low is applied to the 3 input of the NAND circuit 135 due to the action of the inverter 137.

Since the car is not moving and since the capacitor 36 is not charged, the voltage at the input to the inverter 126 is low and a high potential is applied to the 2 input of the amplifier 122 (having no effect on the F-F circuit 124 which is in its deactivate state) and a high voltage is applied to the 1 input of the NAND circuit 128, to the input of the inverter 140, to the 1 input of he NAND circuit 134 and to the 2 input of the NAND circuit 135. Since the 2 input of the NAND circuit 128 is low (at low speeds) there is no effect on the bellows 152. The output of the inverter 140 is low and charging current is shunted away from the capacitor 36 by both inverters 138 and 140 due to the parallel connection of the outputs, whereby the capacitor 36 cannot be charged. As for the NAND circuit 134, its 1 input is high due to its connection to the output of the inverter 126, its 2 input is high due to its connection to the amplifier 120 (the F-F 124 being in its deactivate state) and its 3 input is low due to the inverter 136, whereby the output of the NAND circuit 134 is high and there is no discharge path for the capacitor 36 through the NAND circuit 134. As for the NAND circuit 135, its 2 input is high due to its connection to the output of the inverter 126, its 1 input may be low due to its connection to the amplifier 122 (the F-F 124 being in its Deactivate State) and its 3 input is low due to the fact that the input of the inverter 137 is high due to its connection to the junction of the resistors 24 and 25, whereby the output of the NAND circuit 135 is high and there is no discharge path for capacitor 36 through the NAND circuit 135.

The operator puts his foot on the accelerator and the car starts to move and gain speed and the voltage at the I input of the differential amplifier 44 and the voltage of the NI input of the differential amplifier 64 increase, the NAND circuit 132 and the resistor 142 acting to cause a voltage lag before the voltage at the I input terminal of the differential amplifier 44 exceeds the voltage applied to the NI input thereof. That is, the voltage at the I input terminal would reach the voltage at the NI terminal of the differential amplifier 44 at a lower speed except for the action of the NAND circuit 132 and the resistor 142.

As soon as the I input voltage to the differential amplifier 44 exceeds the NI input voltage, the voltage at the input to the inverter 82 becomes less positive or low. The output voltage of the inverter 82 becomes high. However, since the 1 input of the NAND circuit 32 is low, the output thereof remains high. The high voltage is applied to the 2 input of the amplifier 120 but a high voltage on the 2 input of the amplifier 120 does not change the state of the F-F circuit 124. Since an input (the 3 input) of the NAND circuit 128 is low, mere increase of speed of the car above the desired minimum value cannot in itself cause activation of the valve 162, whereby merely exceeding the desired minimum speed does not cause control of the accelerator by the described speed control device. The 2 input of the NAND circuit 134 may be high. The 2 input of the NAND circuit 132 is high. Due to the fact that the 1 input of the NAND circuit 32 is low, there is no change of input potential to the inverter 136 or 138 or to the 3 input of the NAND circuit 134. The output of the NAND circuit 134 therefore remains high.

The voltage at the NI input of the differential amplifier 64 exceeds the voltage at the I input thereof since the car is moving and since the capacitor 36 is discharged. The voltage at the input of the inverter 126 is high whereby the voltage at the output thereof is low. A low is applied to the 2 input of the amplifier 122, putting the F-F circuit 124 into its activate state whereby the output of the amplifier 122 becomes high. A low is applied to the 1 input of the NAND circuit 128 and to the input of the inverter 140, to the 1 input of the NAND circuit 134 and to the 2 input of the NAND circuit 135. Since the 1 input of the NAND circuit 128 is low, the output of the NAND circuit 128 remains high and the bellows 152 is not actuated. Since the input to the inverter 140 is low, its output is high. However, the input to the inverter 138 is high and the capacitor 36 is prevented from charging through the resistor 57 and the diode 58. Therefore, in the Off position of the switch 14, the capacitor 36 cannot be charged no matter what the speed of the car.

If the car is operating at above its minimum speed and if it is desired to operate the speed control at the then car operating speed, the button 14 is pushed to its Set or Advance position, in which position the contacts 12, 18 and 20 are all in electrical contact. The resistor 34 is much lower in value than the resistor 22, whereby the voltage at the junction of the resistors 22 and 24 goes up to about 12 volts and the Zener diode 28 breaks down and a high is applied to the 1 input of the NAND circuit 32. A high continues to be applied to the 4 input of the NAND circuit 128 and a low continues to be applied to the 3 input of the NAND circuit 135. Since the speed of the car is above the desired minimum, a high is also applied to the 2 input of the NAND circuit 32. A low is applied to the 1 input of the NAND circuit 132 whereby its output becomes high and the lag effect of the resistor 142 disappears. A high is applied to the 3 input of the NAND circuit 134. A low is applied to the input of the inverter 138 and its output becomes high whereby the inverter 138 ceases to shunt charge current from the capacitor 36 and the capacitor 36 charges through the resistor 57 and the diode 58. However, as long as the voltage across the capacitor 36 is lower than the voltage on the NI terminal of the amplifier 64, low voltage appears at the output of the inverter 126 and low continues to be applied to the 1 input of the NAND circuit 128, whereby the bellows 152 does not affect the car throttle. The input of the inverter 140 is low, whereby the inverter 140 does not act to prevent charging of the capacitor 36. The 1 input of the NAND circuit 134 is low and so the output of the NAND circuit 134 stays high whereby it cannot act as a discharge of the capacitor 36. Also, due to the low on the 3 input of the NAND circuit 135, the NAND circuit 135 cannot discharge the capacitor 36.

Soon, as the capacitor 36 charges, the voltage at the I input to the differential amplifier 64 equals or exceeds the voltage at the NI input thereof, due to the charging of the capacitor 36, and due to the operation of the field effect transistor 55 and of the resistor 146. The voltage at the input to the inverter 126 goes low and the output thereof goes high. This has no effect on the F-F circuit 124, whereby the output of the amplifier 122 stays high and the amplifier 122 continues to apply a high to the 3 input of the NAND circuit 128. The 2 input of the NAND circuit 128 is high since the car is going above the desired minimum speed. A high is applied to the 4 input of the NAND circuit 128 due to its connection to the junction of the resistors 24 and 25. Therefore, the bellows 152 is actuated to move the accelerator to a more open or higher speed position. The output of the inverter 140 goes low and stops further charging of the capacitor 36, and the 1 input to the NAND circuit 134 goes high. The amplifier 120 applies a low to the 2 input of the NAND circuit 132. Also a low is applied to the 2 input of the NAND circuit 134, whereby its output stays high, and there is no discharge of the capacitor 36 by the NAND circuit 134, and the resistor 144 has no effect on the charge of the capacitor 36. As long as the voltage at the I terminal of the differential amplifier 64 is less than the voltage on the NI terminal thereof (the button 14 being at its Set or Advance position and the car speed being above the desired minimum speed), the capacitor 36 is charged and as soon as the voltage on the I terminal of the differential amplifier 64 exceeds the voltage on the NI terminal thereof, the capacitor 36 no longer charges. When charging of the capacitor 36 is stopped by rendering one or the other or both of the inverters 140 and 138 conductive, the junction of the diode 58 and the resistor 57 is at ground, and the capacitor 36 cannot discharge through the back biased diode 58.

When the push button 14 is released, the spring 21 pushes the button 14 back to its Off position as shown. Therefore, the charge on the capacitor 36 is a measure of the highest speed of the car during the time the button 14 is held in its Set or Advance position (the car speed being above the minimum speed), and the charge on the capacitor 36 remains at this value after the button 14 is released.

It will be noted that while the ignition switch 42 is closed, a voltage is applied between the drain and gate electrodes of the field effect transistor 55 in series with the capacitor 36 to ground. Since the leakage current through the transistor 55 is about equal to the leakage current of the capacitor 36, any discharge due to leakage through the capacitor 36 is made up by leakage through the field effect transistor 55. Also, the diode 38 is reverse biased by the source connected to the terminal 10 by way of the drain to source path of the transistor 55 and the resistor 145, whereby any current flowing through the diode 38 is very small. Similarly, the diode 58 is reverse biased by the voltage across the capacitor 36 whenever either or both of the inverters 138 or 140 exhibits a low output potential, whereby any current flowing through the diode 58 is low. Furthermore, reverse leakage of the two diodes 38 and 58 is about the same whereby the leakage of these diodes is supplied by the battery connected to the terminal 10 and not by the capacitor 36. The NAND circuit 134 has a low applied to its 3 input as long as the button 14 is in its Off position. The NAND circuit 135 has a low applied to its 3 input as long as the button 14 is not in its Retard position. Therefore, neither of the NAND circuits 134 or 135 provides a discharge path for the capacitor 36 and the charge on capacitor 36 will not leak since there is no discharge path therefore as long as the button 14 is in its Off position.

It is assumed that the button 14 is released when the car is going at a speed higher than the desired minimum speed, such that a speed of, for example, 40 miles an hour is set into the speed control device. Due to the Off position of the button 14, the inverter 138 applies a low to the junction of the resistor 57 and the diode 58, whereby the capacitor 36 is no longer being charged. The capacitor 36 does not discharge, for the reasons previously explained. If the speed of the car is higher than the set speed, the voltage at the input to the inverter 126 is high and the voltage on the 1 input of the NAND circuit 128 is low. Although low is applied to the 2 input of the amplifier at 122, whereby high is applied to the 3 input of the NAND circuit 128, high is not applied to all four input of the NAND circuit 128 and therefore the solenoid 92 is not actuated and the bellows 152 does not affect the throttle. The car slows down if the operator's foot is off the throttle. As soon as the speed of the car reduces to the set speed, the input to the inverter 126 goes low. The output of the inverter 126 is high and a high is applied to the 1 input of the NAND circuit 128. The 2 input to the NAND circuit 128 is high since the car is going faster than the desired minimum speed. The 3 input of the NAND circuit 128 is high since the F-F circuit 124 is in its activate state due to the low previously applied to the 2 input of the amplifier 122. The 4 input of the NAND circuit 128 is high since the button 14 is not in its retard position. Since all four of the inputs to the NAND circuit 128 are high, the output thereof is low, the output of the inverter 130 is high and the transistor 94 becomes conductive and the solenoid 92 is energized and the valve 162 closes and the bellows 152 contracts and the throttle is advanced. As soon as the car speed becomes greater than the set speed, the 1 input of the NAND circuit 128 goes low and the bellows is released.

As has been noted above, the road speed voltage at the high voltage end of the resistor 114, which is applied to the I input of the differential amplifier 44 and to the NI input of the differential amplifier 64 is a direct voltage having a ripple thereon. At or near the minimum speed set into the speed control system by setting the slider of the potentiometer 54, the low points in the road speed voltage may be lower than the voltage corresponding to the setting of the potentiometer 54, whereby the speed control system may be turned off since the F-F 124 will be deactivated each time the voltage applied to the NI terminal of the differential amplifier 44 exceeds the voltage applied to the I terminal thereof. The rectifier 174 and the capacitor 172 act as a filter to smooth the voltage applied to the I input terminal of the amplifier 44 to prevent the speed control system from being turned off by the ripples in the described speed control system. However, the ripples appearing on the road speed voltage are useful in controlling the duty cycle of the valve 162 which in turn controls the speed of the engine by controlling the position of the car accelerator.

The voltage across the storage capacitor 36 is substantially uniform, whereby as the car speed increases, the road speed voltage increases from a value at which the top voltages of the rippling road speed voltage is below the voltage across the storage capacitor 36, to a value at which the bottom voltage of the rippling road speed voltage is above the voltage across the storage capacitor 36. At car speeds where the top of the ripples of the road speed voltage is less than the voltage across the capacitor 36, the valve 162 is actuated to contract the bellows 152 to advance the car accelerator (not shown) to a maximum extent. At car speeds at which the bottom of the ripples of the road speed voltage is above the voltage of the storage capacitor 36, the valve 162 permits the bellows 152 to expand to permit the car accelerator to be retarded by a spring normally fixed thereto. When the tops and bottoms of the car speed voltage are respectively higher and lower than the voltage of the capacitor 36, the valve 162 is operated to alternately cause the bellows 152 to contract and to permit it to expand, whereby the bellows 152 takes a position either to increase the speed of the car or to permit the speed of the car to decrease, or to keep the speed of the car constant, depending on the relative values of the duration of time that the road speed voltage is above or below the capacitor voltage. When the speed of the car is equal to the set speed, the operation of the valve 162 is such that the bellows 152 is caused to contract for one-half of the time and the bellows 152 is permitted to expand for the other half of the time during each cycle of the ripple on top of the road speed voltage. Therefore, after the button 14 is released, the car runs at a set speed corresponding to the speed of the car at the moment that the button 14 is released.

If it is desired to reduce the set speed, the button 14 is pushed all the way into its Retard position. In this position of the button 14, neither contact 18 or 20 is connected to a power source. The 4 input to the NAND circuit 128 goes low, whereby, as long as the button 14 is in its Retard position, the bellows 152 cannot affect the setting of the car's accelerator. Also, the 3 input of the NAND circuit 135 goes high. The 1 input of the NAND cicuit 135 is high since the F-F 124 is activated. The 2 input of the NAND circuit 135 is high if the voltage on the I input to the differential amplifier 64 is higher than the voltage on the NI input thereof resulting from the speed of the car, and the capacitor 36 discharges through the NAND circuit 135 to ground until the voltage of the charge on the capacitor 36 equals the voltage due to the speed of the car. The operator releases the button 14 and the spring 21 pushes it through the Set or Advance position, whereby, when the button is in its Set or Advance position, the capacitor 36 takes on a charge (if necessary) depending on the speed of the car at the moment that the button 14 was in the Set or Advance position, and further operation of the car is at the speed as determined by the charge on the capacitor 36 as set by the button 14 when released.

If the brake is touched momentarily, the switch 90 is opened and the switch 76 is closed. Opening the switch 90 disconnects the solenoid 92 from the power supply and the valve 162 is so actuated that the bellows 152 has no effect on the throttle. Furthermore, the input to the inverter 82 goes high, whereby its output goes low, the 2 input of the NAND circuit 128 goes low, and the F-F circuit 124 goes to its deactivate state and the 3 input of the NAND circuit 128 goes low. The transistor 94 is blocked and the solenoid 92 is disconnected from ground by blocking the transistor 94. Therefore, as long as the brake pedal is down the connection to both terminals of the solenoid 92 are broken whereby it cannot operate and the speed control stops operating.

Also, making the output of the inverter 82 low (by putting on the brake) puts the F-F circuit 124 into its deactivate state (as noted above), whereby low potential is applied to the 3 input of the NAND circuit 128 and the described speed control is disabled by the act of momentarily putting on the brake. This F-F 124 stays in its deactivate state until the speed control is again made operative as noted hereinbelow.

Since the capacitor 36 is not discharged by putting on the brakes, the car speed control may be made to speed up the car to the set speed, that is the set speed may be resumed after the brakes are released (which causes the switch 90 to close and switch 76 to open) unless the speed of the car is below the desired minimum speed. If the speed is below the desired minimum speed, the car must be brought up to the desired minimum speed by manipulation of the accelerator before the set speed can be resumed.

One way of resuming the set speed after the brakes are depressed is to close the Resume switch 66 momentarily. This causes a high potential to appear at the input of the inverter 126, whereby a low is applied to the 2 input of the amplifier 122 and F-F 124 takes its active state. After the Resume switch 66 is released, the 3 input of the NAND circuit 128 is high and, the speed of the car being above the desired minimum speed, the 2 input of the NAND circuit 128 is high. The 4 input of the NAND circuit 128 is high since the button 14 is in its Off position. If the speed of the car is below the set speed, the 1 input of the NAND circuit 128 will be high and the output of the NAND circuit 128 will be low to cause operation of the valve 166 just as if the brakes had not been depressed.

Another way of resuming the set speed is to speed up the car, as by depressing the accelerator until until the speed of the car is above the set speed and then releasing the accelerator. When the speed of the car is above the set speeed, the output of the inverter 126 is low and the F-F circuit 124 is activated and then, as soon as the car coasts down to a speed below the set speed, all inputs to the NAND circuit 128 will be high and the valve 162 will be actuated to open the throttle.

Let it be assumed that after the speed control apparatus has been set for car operation at a certain (high) speed (whereby the capacitor 36 is charged to a voltage corresponding to the said certain (high) speed), that the brake had been depressed and had been released, whereby the speed is reduced below the said certain (high) speed and whereby the speed control is also disabled. If it is desired to set the speed of the speed control mechanism at a new speed which is lower than the (high) speed set into the mechanism before the brakes were depressed, this may be done by pushing the button 14 all the way in to the Retard position (whereby the storage capacitor 36 is discharged as explained above) and then by letting the button 14 snap back to the Off position when the speed of the car is running at the desired new lower speed. However, since the car is now running at a speed which is lower than said certain (high) speed that was set into the speed control mechanism before the brakes were operated, the operator may not realize that the button 14 should be pushed all the way in to the Retard position to discharge the capacitor 36 and he may only push the button in to the Set and Advance position and expect the car control apparatus to operate the car at a new lower speed than the said certain (high) speed.

Setting a new speed into the speed control which is less than the speed determined by the previous charging of the capacitor 36 by pressing the button 14 in only to its Set and Advance position operates as follows:

Since the car is going at a speed lower than that corresponding to the charge on the capacitor 36, the output of the inverter 126 is high and the 1 input to the NAND circuit 128 is also high. The input to the inverter 140 is high whereby it prevents charge of the capacitor 36. The 1 input of the NAND circuit 134 is high. The F-F 124 is in its deactivate condition (as a result of the brakes having been put on) whereby the 3 input of the NAND circuit 128 is low and there is no control of the bellows 152. The 2 input of the NAND circuit 134 is high since the output of the amplifier 120 is high. Since the button 14 is at the Set position thereof and since the car is going over the desired minimum speed, both inputs to the NAND circuit 32 are high whereby the 3 input of the NAND circuit 134 is also high. The output of the NAND circuit 134 is low since all 3 of the inputs are high and the capacitor 36 discharges slowly through the diode 38 and the resistor 144 into the low output potential appearing at the output of the NAND circuit 134. As soon as the voltage across the capacitor 36 becomes equal to or less than the voltage produced by the speed sensor 96, the voltage at the input to the inverter 126 goes high and the 1 input of the NAND circuit 134 goes low and discharge of the capacitor 36 by the NAND circuit 134 ceases. The capacitor 36 now is charged to a voltage corresponding to the car's new speed. Also, the low applied to the 2 input of the amplifier 122 changes the condition of the F-F 124 to its activate state, and, upon release of the button 14 to its Off position, the speed control will keep the car going at its new set speed which is equal to the highest speed obtained while the button 14 is in its Set or Advance position.

It will be noted that this speed control apparatus has the following features.

(1) A minimum speed below which the speed control apparatus cannot operate may be set into the apparatus.

(2) The speed control can be set to maintain the car speed at any speed at which the car is operating.

(3) Depressing the brake disables the throttle control as long as the brake is held down.

(4) Depressing the brake deactivates the speed control apparatus even after the brake is released and until the speed control apparatus is reactivated.

(5) The operator may advance the set speed by pushing a button and increasing the car speed.

(6) The operator may decrease the set speed by pushing the same button and letting the speed of the car decrease.

(7) After braking the car speed, the set speed may be resumed by pressing a resume button.

(8) After braking the car speed, the set speed may be resumed automatically by merely speeding up the car to the previously set speed.

(9) After braking the car from a high speed, the speed control may be set to a new lower speed by pressing the button to the Set and Advance position.

(10) Safety means are provided to insure disablement of the speed control while the brake is on.

(11) Manipulation of only one button provides Off, Set and Advance and Retard control of the speed control apparatus and

(12) Since the speed control apparatus draws very little current (in the order of one tenth of an ampere), the speed control apparatus may be energized by turning on the ignition switch and may be kept on continuously while the car is operating without danger of discharging the car battery.

Since various modifications of the disclosed particular control will occur to a person skilled in the art the above description is considered to be illustrative and not in a limiting sense.

What is claimed is:

1. An electronic speed control for an automotive vehicle having a throttle, said vehicle including sensing means adapted to generate a voltage indicative of the actual speed thereof, means to charge a capacitor to a voltage that is a measure of the speed at which it is desired the vehicle operate, means to produce a voltage that is a measure of a minimum speed below which the speed control is to be inoperative, first difference means coupled to said capacitor to compare the voltage corresponding to the desired speed with the voltage corresponding to the actual speed, second difference means to compare the voltage corresponding to the minimum speed with the voltage corresponding to the actual speed, means responsive to said first difference means to operate the throttle of the vehicle in accordance with the difference between the actual and desired speeds in a manner to maintain the vehicle at the desired speed, and means responsive to said second difference means to disable the throttle operating means in response to to the actual speed being less than the minimum speed.

2. The invention as expressed in claim 1 in which means are provided to disable the throttle operating means in response to the operation of a switch that may be mechanically coupled to the brake pedal of the vehicle.

3. The invention as expressed in claim 1 in which means are provided to disable the throttle operating means in response to operating a switch that may be mechanically coupled to the brake pedal of the vehicle and in which resume switch means are provided to cause resumption of the speed control at the desired speed by the operation of the resume switch.

4. The invention as expressed in claim 1 in which means are provided to increase or decrease the charge on the capacitor, whereby the desired speed may be changed.

5. The invention as expressed in claim 1 in which means are provided to disable the throttle operating means in response to the operation of a switch that may be mechanically coupled to the brake pedal of the vehicle and in which means are provided for causing automatic resumption of the speed control upon the car attaining the desired speed.

6. The invention as expressed in claim 1 in which means are provided to disable the throttle operating means in response to the operation of a switch that may be mechanically coupled to the brake pedal of the vehicle and in which means are provided to discharge said capacitor, after the throttle operating means is disabled, from a voltage corresponding to the desired speed for which the speed control was set before said throttle operating means was disabled to a new lower voltage corresponding to a lower desired speed and for then enabling said throttle operating means.

7. The invention as expressed in claim 1 wherein said capacitor charging means comprises
   a connection from a terminal of a charging source to one terminal of said capacitor through a rectifier,
   a connection between the terminals of said capacitor including a second rectifier, said second rectifier being poled to discharge said capacitor,
   a connection between the terminals of said capacitor including a control electrode and a main electrode of an electronic device in which the control electrode and main electrode are insulated from each other,
   means to apply a voltage across said electrodes of said electronic device and said capacitor in series, and
   means to reverse bias each of said rectifiers.

8. The invention as expressed in claim 7 in which means are provided for sensing the voltage across said capacitor comprising a load impedance connected in said last mentionel connection between the terminals of said capacitor.

9. A speed control for an automotive vehicle having a throttle and brake, said vehicle including sensing means adapted to generate a voltage indicative of the actual speed thereof, comprising
   means to produce a voltage which is a measure of a predetermined speed for said vehicle,
   means to produce a voltage that is a measure of a minimum speed below which the speed control is to be inoperative,
   a voltage storing means,
   a switch means including a switch having three positions,
   said switch means in one of said switch positions causing charging of said voltage storing means to a voltage which is a measure of said vehicle speed and in another of said switch positions reducing the voltage stored in said voltage storing means and in a third of said switch positions not affecting the voltage stored in said voltage storage means.
   means to prevent storing of voltage in said voltage storing means, said prevention means responding when said voltage corresponding to said minimum speed is greater than said voltage which is a measure of the actual speed of the vehicle, and
   means to increase the opening of the throttle of said vehicle when the speed of said vehicle is less than a speed corresponding to a voltage stored in said voltage storing means.

10. The invention as expressed in claim 9 in which means are provided to disable said means to open said throttle in response to the application of the brake of said vehicle.

References Cited

UNITED STATES PATENTS

| 3,331,478 | 7/1967 | Trifiletti et al. | 180—105 X |
| 3,381,771 | 5/1968 | Granger et al. | 180—105 |
| 3,410,360 | 11/1968 | Neapolitakis et al. | 180—105 |

A. HARRY LEVY, Primary Examiner

U.S. Cl. X.R.

123—102; 192—3; 317—5